(12) United States Patent
Kallinen et al.

(10) Patent No.: US 7,631,840 B2
(45) Date of Patent: Dec. 15, 2009

(54) PIVOTING PANEL FOR AIRCRAFT, AND COMPOSITE SUPPORT PIECE

(75) Inventors: Risto Kallinen, Bristol (GB); Jani Korpimäki, Ruutana (FI); Jussi Linjama, Jämsä (FI); Antti Aho-Mantila, Halli (FI); Pentti Ahtonen, Kuhmo (FI)

(73) Assignee: Patria Aerostructures Oy, Halli (FI)

( * ) Notice: Subject to any disclaimer, the term of this patent is extended or adjusted under 35 U.S.C. 154(b) by 0 days.

(21) Appl. No.: 11/447,235

(22) Filed: Jun. 5, 2006

(65) Prior Publication Data

US 2009/0072090 A1    Mar. 19, 2009

Related U.S. Application Data

(63) Continuation of application No. 11/242,608, filed on Oct. 3, 2005, now abandoned.

(30) Foreign Application Priority Data

Oct. 8, 2004    (FI) .................................. 20041310

(51) Int. Cl.
*B64C 9/00* (2006.01)
*B64C 3/18* (2006.01)

(52) U.S. Cl. ..................... 244/213; 244/215; 244/123.1

(58) Field of Classification Search ......... 244/213–217, 244/99.12, 131, 123.1; 446/30–32, 36–38, 446/61, 66, 67
See application file for complete search history.

(56) References Cited

U.S. PATENT DOCUMENTS 2,403,568 A * 7/1946 Watter ..................... 244/123.1
2,451,131 A * 10/1948 Vidal et al. ................ 156/222
3,102,559 A * 9/1963 Koppelman et al. ...... 139/384 R
3,140,066 A * 7/1964 Sutton et al. ................. 244/215
3,768,760 A * 10/1973 Jensen ..................... 244/123.6
3,775,238 A * 11/1973 Lyman ...................... 428/167
3,890,749 A 6/1975 Gunther
4,003,533 A 1/1977 Carter et al.
4,131,252 A * 12/1978 Dean et al. ................. 244/212
4,335,671 A * 6/1982 Warner et al. ............... 114/274
4,470,366 A 9/1984 Williams
4,471,927 A * 9/1984 Rudolph et al. ............. 244/215
4,673,606 A 6/1987 Unden et al.
5,224,670 A * 7/1993 Padden ..................... 244/123.3
5,429,853 A 7/1995 Darrieux
5,622,336 A * 4/1997 Chavanne et al. ......... 244/129.1
5,836,550 A * 11/1998 Paez .......................... 244/214
6,173,924 B1 * 1/2001 Young et al. ................ 244/215
6,234,423 B1 * 5/2001 Hirahara et al. .......... 244/123.7
6,419,189 B1 * 7/2002 DiChiara et al. ......... 244/123.1
6,689,246 B2 * 2/2004 Hirahara et al. ............. 156/292
6,808,143 B2 * 10/2004 Munk et al. .............. 244/123.1

(Continued)

FOREIGN PATENT DOCUMENTS

| EP | 0 532 016 | 3/1993 |
| EP | 1 227 035 | 7/2002 |
| SE | 446 847 | 8/1985 |

*Primary Examiner*—Michael R Mansen
*Assistant Examiner*—Joseph W Sanderson
(74) *Attorney, Agent, or Firm*—Ladas and Parry LLP

(57) ABSTRACT

A pivoting panel for an aircraft and to a composite support piece for this kind panel. The support piece (17) is arranged as a part of the frame structure of the panel (3). The support piece has an extension portion (23) to which an actuator connection fitting (7) of an actuator (4) can be fastened. The extension portion (23) distributes the forces to the structures of the panel (3).

18 Claims, 7 Drawing Sheets

U.S. PATENT DOCUMENTS

| | | |
|---|---|---|
| 6,889,937 B2 * | 5/2005 | Simpson et al. .......... 244/123.1 |
| 7,063,292 B2 * | 6/2006 | Perez-Sanchez ............ 244/216 |
| 2001/0017336 A1 | 8/2001 | Hirahara et al. |
| 2002/0100840 A1 | 8/2002 | Billinger et al. |
| 2004/0011927 A1 * | 1/2004 | Christman et al. .......... 244/131 |
| 2006/0186269 A1 * | 8/2006 | Kota et al. ................ 244/123.1 |

* cited by examiner

PIVOTING PANEL FOR AIRCRAFT, AND COMPOSITE SUPPORT PIECE

This application is a continuation of application Ser. No. 11/242,608 filed on Oct. 3, 2005, now abandoned claims the benefit thereof and incorporates the same by reference.

BACKGROUND OF THE INVENTION

The invention relates to a pivoting panel for an aircraft, comprising: a first surface plate and a second surface plate; a front spar at the front edge of the panel and a rear spar at the rear edge of the panel; a frame structure arranged into a space defined by the surface plates and the spars; at least two hinges arranged on the front edge portion of the panel; and at least one actuator connection fitting to which an actuator is connectable for pivoting the panel in relation to the hinges.

The invention further relates to a composite support piece made of a polymer matrix and reinforcing fibers.

Aircraft, such as airplanes and the like, are provided with different kinds of pivoting panels that can be used for directing the aircraft and for controlling different flight situations, such as landings and take-offs. Such pivoting panels include elevators, rudders and different ailerons, air brakes and landing flaps. Further, on the upper surface of their wings, airplanes are provided with spoilers, which are also kind of panels and which cancel the lifting force caused by the wings during landing. Spoilers can also be used for directing airflow caused by the trailing edge of a wing to adhere better to the upper surface of the wing, thereby preventing disturbing turbulences. Aircraft may thus be provided with various pivoting panels that may each have a specific purpose of use.

A panel is typically hinged to the aircraft at its leading edge. The panel is pivoted in relation to the hinges by means of a hydraulic actuator. Since panels often have a relatively large surface area and since the speed of an aircraft in operation is high, the panel and the actuator are subjected to extremely high forces. One of the problems relating to pivoting panels is how to connect the actuator and the panel to each other. An actuator connection fitting is difficult to secure firmly to the panel. Prior art solutions are heavy and their use in connection with panels made of composite materials is problematic.

BRIEF DISCLOSURE OF THE INVENTION

It is an object of the invention to provide a novel and improved pivoting panel and a composite support piece for this kind of panel.

The panel of the invention is characterized in that the frame structure comprises at least one support piece made of a composite material; the support piece comprises at least an extension portion; the position of extension portion is arranged to correspond to that of the actuator connection fitting; and the extension portion has a first surface and a second surface, the first surface being attached to an inner surface of the first surface plate of the panel and the second surface of the extension portion being attached to an inner surface of the second surface plate, whereby during assembly the support piece is arranged as an integral portion of the panel.

The support piece of the invention is characterized in that the support piece comprises at least an extension portion having a first surface and a second surface; and the support piece comprises a first branch and a second branch arranged to a first edge of the extension portion.

An essential idea of the invention is to integrate at least one composite support piece comprising an extension portion with a first surface plate and a second surface plate of a composite panel by arranging it between them. The extension portion is attachable against the inner surfaces of the first and the second surface plates of the panel. The position of the extension portion is arranged to correspond to that of the actuator connection fitting between the panel and the actuator.

An advantage of the invention is that the extension portion can distribute the forces and the strain acting on the actuator connection fitting to a wide panel surface area.

An essential idea of an embodiment of the invention is that the cross-section of the extension portion is wedge-shaped, the front part of the extension portion being thicker than its rear part. Consequently, the extension portion can be fitted well into the wedge-shaped space formed by the trailing edge of the panel.

An essential idea of an embodiment of the invention is that the extension portion is substantially of the shape of a swim fin. The extension portion comprises a substantially straight rear edge and sides provided with sloping portions at the rear edge end and portions curved inward at the front edge end. The extension portion narrows towards the front edge.

An essential idea of an embodiment of the invention is that the first surface and the second surface of the extension portion are substantially flat surfaces.

An essential idea of an embodiment of the invention is that the surface area of the extension portion is clearly greater than the surface area of the fastening flange of the actuator connection fitting.

An essential idea of an embodiment of the invention is that the surface area of the extension portion is at least twice the surface area of the fastening flange of the actuator connection fitting.

An essential idea of an embodiment of the invention is that the surface area of the extension portion is at least three times the surface area of the fastening flange of the actuator connection fitting.

An essential idea of an embodiment of the invention is that the support piece comprises a first branch and a second branch arranged at a distance from one another. The branches are joined by their first ends to the first edge of the extension portion. The second ends of the branches extend to the front edge portion of the panel. The second ends of the first branch and the second branch have hinges attached thereto. The support piece thus provides a uniform fastening portion for fastening both the actuator connection fitting and the hinges.

An essential idea of an embodiment of the invention is that the distance between the second ends of the branches is greater than that between the first ends of the branches, the branches being diagonally tilted away from each other. This allows the distance between the hinges to be made greater, which is advantageous to panel support. Further, between the branches is left a free space that can be used for example when the support piece and the surface plates are to be fastened to each other.

An essential idea of an embodiment of the invention is that the branches and the extension portion form a uniform part.

An essential idea of an embodiment of the invention is that the branches are made of separate branch pieces fastened to fastening protrusions provided on the front edge of the extension portion.

An essential idea of an embodiment of the invention is that the cross-section of the branches is substantially similar to a U turned 90 degrees, the branches thus comprising lateral flanges and a vertical flange between them.

An essential idea of an embodiment of the invention is that the lateral flanges of the branches are fastened to the surface plates of the panel.

An essential idea of an embodiment of the invention is that the free ends of the branches are provided with end flanges for fastening hinges thereto.

An essential idea of an embodiment of the invention is that the panel is made of a composite material. The composite material comprises one or more reinforcing fibers and one or more polymer matrices. The reinforcing fiber may be carbon fiber and the polymer matrix may be some plastic binding agent or resin.

An essential idea of an embodiment of the invention is that during assembly the support piece is arranged to form an undetachable part of the panel.

An essential idea of an embodiment of the invention is that the frame structure of the panel comprises a plural number of longitudinal supports between the surface plates. The longitudinal supports comprise two lateral flanges with a vertical flange between them. The lateral flanges are attached to the surface plates. A front end of a longitudinal support is fastened to the front spar, while its rear end is attached to the rear spar. The longitudinal support is made of a composite material.

An essential idea of an embodiment of the invention is that the frame structure of the panel comprises at least one cellular structure between the surface plates to stiffen the panel. The cellular structure may be a honeycomb structure, for example.

LIST OF THE FIGURES

The invention will be disclosed in greater detail with reference to the accompanying drawings, in which FIG. 1 is a schematic view of an aircraft wing and its pivoting panels;

For the sake of clarity some embodiments of the invention in the figures is simplified. Like parts are indicated with like reference numerals.

DETAILED DESCRIPTION OF SOME EMBODIMENTS OF THE INVENTION

Figure 1:
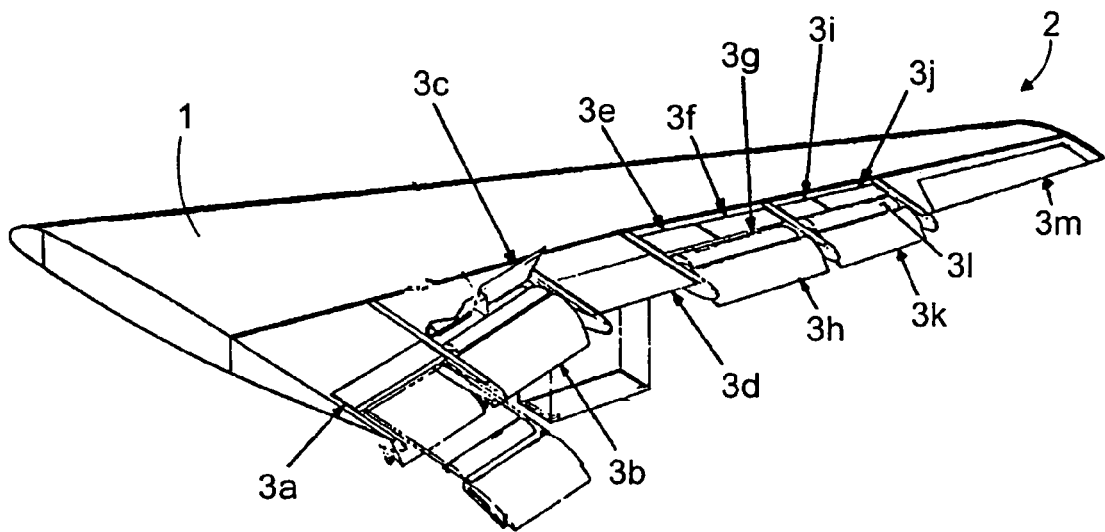

FIG. 1 shows an aircraft wing 1 and different kinds of pivoting panels 3a-3m on its trailing edge 2. Any one of these panels 3 may comprise a structure of the invention.

Figure 2A:
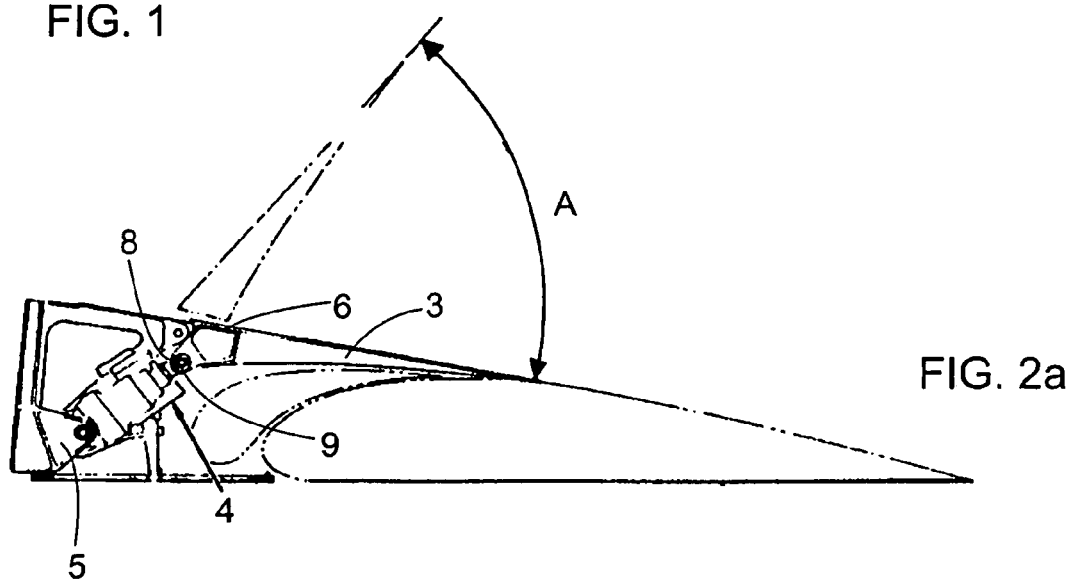
FIG. 2a is a schematic and sectional view of an arrangement for pivoting a pivoting panel by means of an actuator.
Figure 2B:
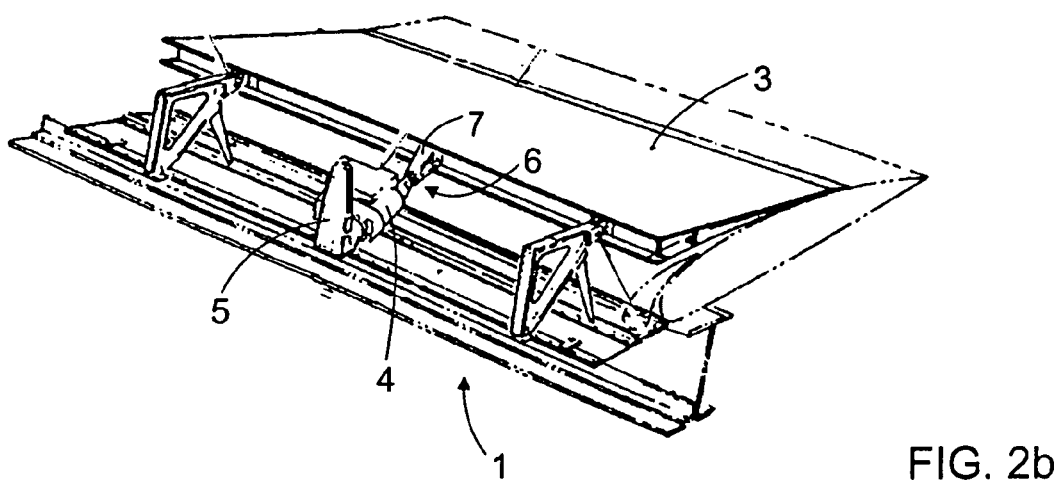
FIG. 2b is a perspective view of the arrangement.

FIGS. 2a and 2b provide a strongly simplified illustration of the moving of a pivoting panel 3 by means of an actuator 4. The actuator 4 may pivot the panel 3 in direction A shown in the Figure. The actuator 4 may be a hydraulic cylinder, for example, or any other device capable of producing a force needed for pivoting the panel 3. When necessary, a plural number of actuators 4 may be provided for one panel 3. The actuator 4 may be connected to a frame structure of the wing 1 at a first fastening point 5, for example. Further, the actuator 4 may be connected to the panel 3 at a second fastening point 6. The second fastening point 6 may comprise an actuator connection fitting 7 that has two flanges at a distance from one another, the flanges being provided with a transverse opening, whereby a fastening loop 8 of the actuator 4 may be placed between the flanges of the actuator connection fitting 7, and an actuator connection pin 9 may be arranged through the loop 8 and the openings. The second fastening point 6 may be on the front edge portion of the panel 3 or, alternatively, it may be at a distance from the front edge of the panel 3, for example between the front edge and the midpoint of the panel 3. In some cases the second fastening point 6 may also be on the portion between the midpoint of the panel 3 and its rear edge. The second fastening point 6 is subjected to extremely high forces, i.e. to loads corresponding possibly even to tens of thousands of kilograms. Therefore it is necessary to be able to transfer the loads acting on the second fastening point 6 to the structure of the panel 3 such that no point load is created but the load is distributed to a wider area.

Figure 3:
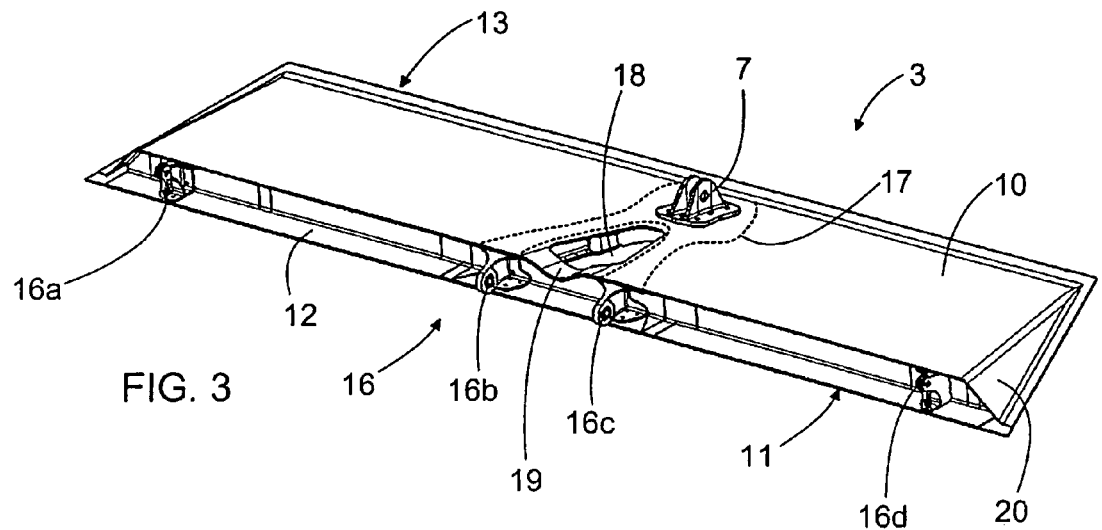
FIGS. 3 and 4 are schematic views of a pivoting panel of the invention seen from the direction of its bottom surface.
Figure 4:
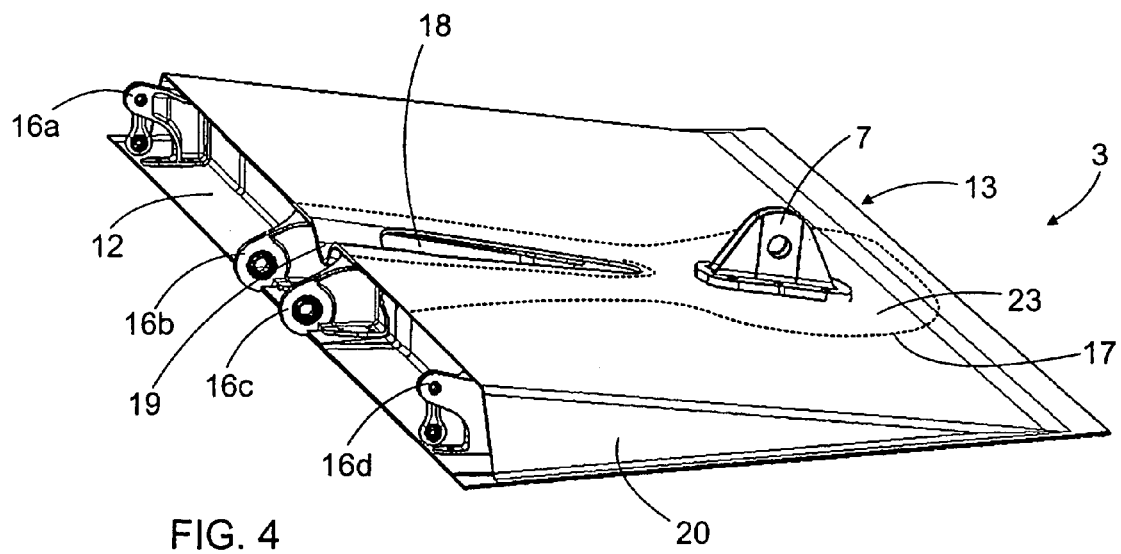

FIGS. 3 and 4 show a pivoting panel 3 of the invention as seen from the side of its first surface. During operation the first surface typically faces downwards, although in some cases it may be upwards. The panel 3 may be made of a composite material, i.e. it may comprise one or more fiber reinforcements and one or more polymer matrices. The fiber reinforcement may be for example fiberglass, carbon fibre or aramide fibre, or the like. The polymer matrix may be for example a plastic binding agent, resin, or the like. The panel 3 may comprise a plural number of components that can be manufactured in separate production phases and then assembled. The panel 3 may comprise a first surface plate 10 and a second surface plate 11, which may both be made of a composite material. Further, the panel 3 may be provided with a front spar 12 at its front edge and, correspondingly, with a rear spar 13 at the rear edge. The surface plates 10, 11 and the spars 12, 13 form a box-type structure that is advantageous as regards its strength properties and forms a sealed structure around the panel 3. The panel 3 is typically wedge-shaped, i.e. the panel 3 becomes thinner towards its rear edge, or the trailing edge. Further, between the surface plates 10, 11 there may a panel frame structure that may include longitudinal supports 14, such as those disclosed below with reference to FIG. 6, or cellular structures 15, such as those disclosed with reference to FIG. 10.

As shown in FIGS. 3 and 4, the front edge portion of the panel 3 may be provided with a plural number of hinges 16. In this case there are four hinges 16a-16d on the front edge of the panel 3 to allow the panel 3 to be pivotally coupled to a fastening point on the aircraft. The hinges 16 may be manufactured in a separate phase, and they may be made of a light metal, such as an aluminium alloy, for example. The hinges 16 may be fastened to the composite panel 3 during assembly. Also the hinges 16 and the actuator connection fitting 7 may be made of a composite material, the panel 3 as a whole being then made of a composite. The outermost hinges 16a and 16d may be fastened by some suitable means, such as rivets, to a fastening point formed on the front edge of the panel 3. The inner hinges 16b and 16c may be fastened to a support piece 17 belonging to the frame structure of the panel 3 and disclosed in greater detail with reference to FIGS. 8 and 9. In FIGS. 3 and 4 the support piece 17 between the surface plates 10 and 11 is illustrated with a broken line. The support piece 17 may comprise an extension portion 23 that may be used for fastening the actuator connection fitting 7. Together with the front spar 12 the support piece 17 may form a substantially triangular support piece between the actuator connection fitting 7 and the inner hinges 16b, 16c. The support piece 17 may be fastened to the surface plates 10 and 11. The first surface plate 10 may be provided with one or more openings 18 to help the fastening of the support piece 17 to the surface plates 10, 11. The support piece 17 may be fastened to the surface plates 10, 11 through the opening 18 by means of rivets, for example, or other fastening members. To prevent humidity and impurities from entering into the panel 3, joints between the support piece 17 and the surface plates 10, 11 and, further, those between the support piece 17 and the front spar 12 may be sealed. This prevents humidity coming through the opening 18 from entering into the structure of the panel 3. There may also be a recess 19 between the opening 18 and the front edge of the panel 3 to allow the actuator 4 to turn closer to the first surface plate 10 of the panel when the panel 3 is in a closed-position.

Figure 5:
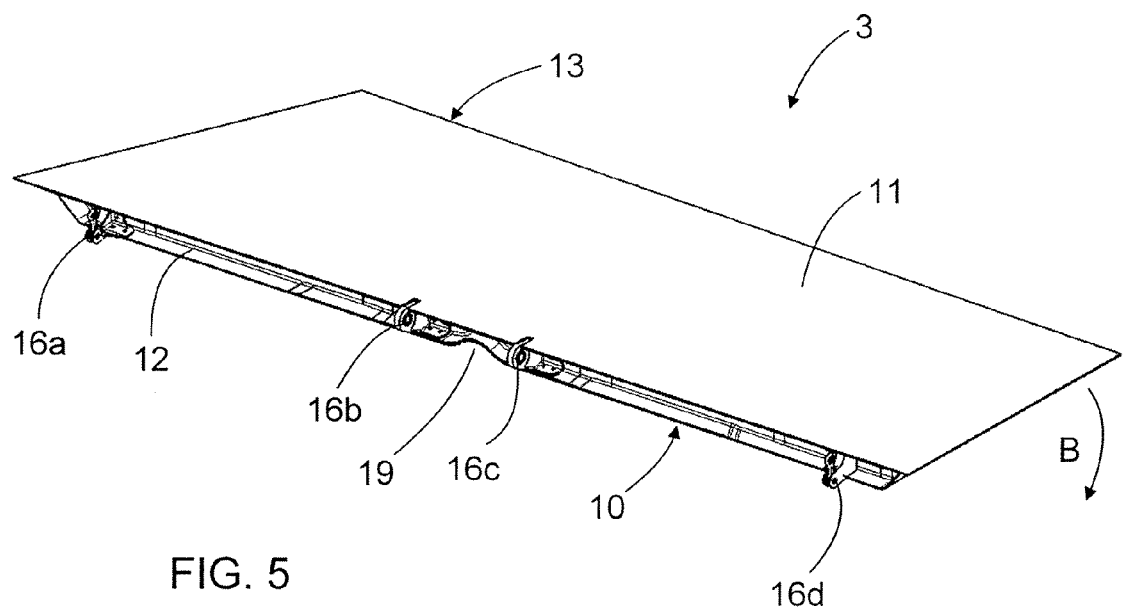
FIG. 5 is a schematic view of a pivoting panel of the invention seen from the direction of its top surface.

FIG. 5 shows that the second surface plate 11 of the panel 3 may be substantially flat. The panel 3 may be arranged to the aircraft in the position shown in FIG. 5, i.e. the second surface plate 11 may face upward and form part of the outer surface of the aircraft. In that case the panel 3 may be pivoted from the closed-position in the direction of arrow B downward in relation to the hinges 16a-16d, which brings the panel 3 to a desired angle in an open-position.

Figure 6:
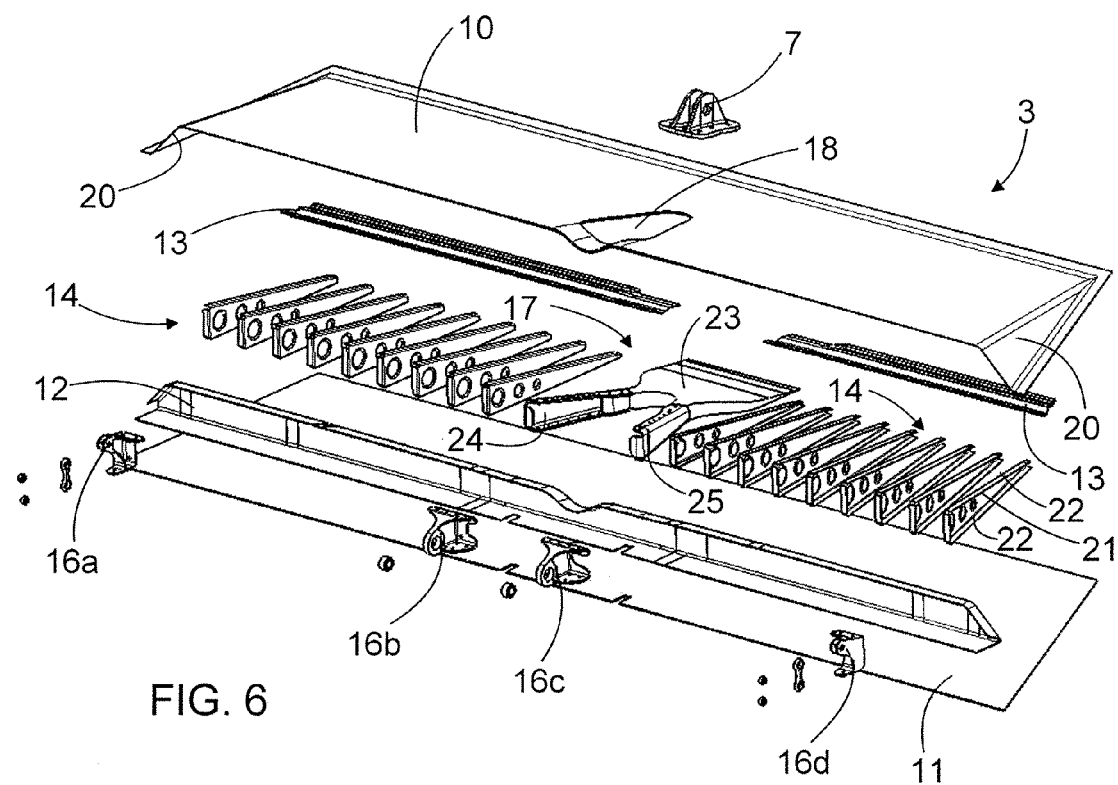
FIG. 6 is a schematic view of a construction of the pivoting panel of the invention, with components of the panel detached from each other.

FIG. 6 shows a construction of a panel 3 of the invention. For the sake of clarity the components of the panel 3 are detached from one another. As shown in the Figure, the first surface plate 10 may comprise end walls 20, whereas the second surface plate 11 may be a planar plate. A plural number of longitudinal supports 14 may be provided and they may be at predetermined intervals between the front spar 12 and the rear spar 13. The longitudinal supports 14 may be made of a composite material. The cross-section of the longitudinal supports 14 may be substantially of the shape of a U turned 90 degrees, and thus the longitudinal support 14 may comprise a vertical flange 21 and lateral flanges 22. The longitudinal support 14 may be fastened to the surface plates 10, 11 by the lateral flanges 22. Further, the front end of the longitudinal support 14 may be fastened to the front spar 12 and its rear end to the rear spar 13. The longitudinal supports 14 may keep the surface plates 10, 11 at a distance from one another. The frame structure of the panel 3 may also comprise one or more support pieces 17 that may be arranged on the portion between the front spar 12 and the rear spar 13, between the surface plates 10, 11. If there is one support piece 17 per panel 3, the support piece 17 may be substantially on the middle of the panel 3 in the width direction thereof. The support piece 17 may be manufactured in a separate phase from a composite material and during assembly it may be arranged to form an integral part of the panel 3. The support piece 17 may comprise an extension portion 23 to which the actuator connection fitting 7 may be fastened by means of rivets, for example, or other similar fastening members. Further, the support piece 17 may comprise a first branch 24 and a second branch 25, first ends of the branches 24, 25 being coupled to the extension portion 23, while second ends thereof may point towards the front edge of the panel 3. The hinges 16b and 16c may be attached to the second ends of the branches 24, 25 by means of suitable fastening members. Since the extension portion 23 extends towards the gradually thinner trailing edge of the panel 3, the cross-section of the extension portion 23 may be wedge-shaped, i.e. the front edge of the extension portion 23 may be thicker than its rear edge. The surface area of the extension portion 23 may be dimensioned so that forces subjected to the actuator connection fitting 7 by the actuator 4 can be distributed to a sufficiently large surface area in the structure of the panel 3. Depending on the dimensions of the panel 3 and its purpose of use, a plural number of support pieces 17 may be used instead of one per panel 3. In the above case the panel 3 is thus driven by means of a plural number of actuators 4.

Figure 7:
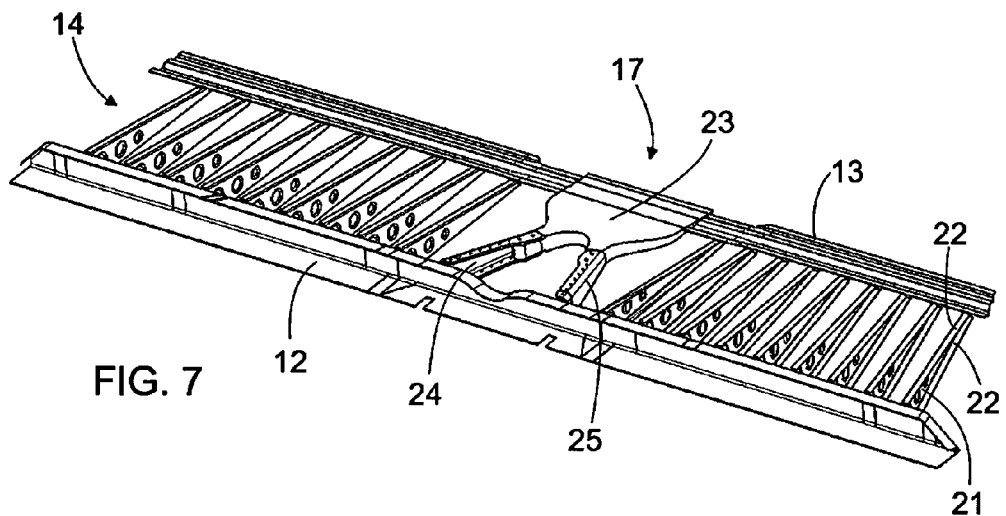
FIG. 7 is a schematic view of a support structure of -the pivoting panel of the invention without the surface plates.

FIG. 7 shows a panel frame structure of FIG. 6 without the actuator connection fitting 7, hinges 16 and surface plates 10, 11.

Figure 8:
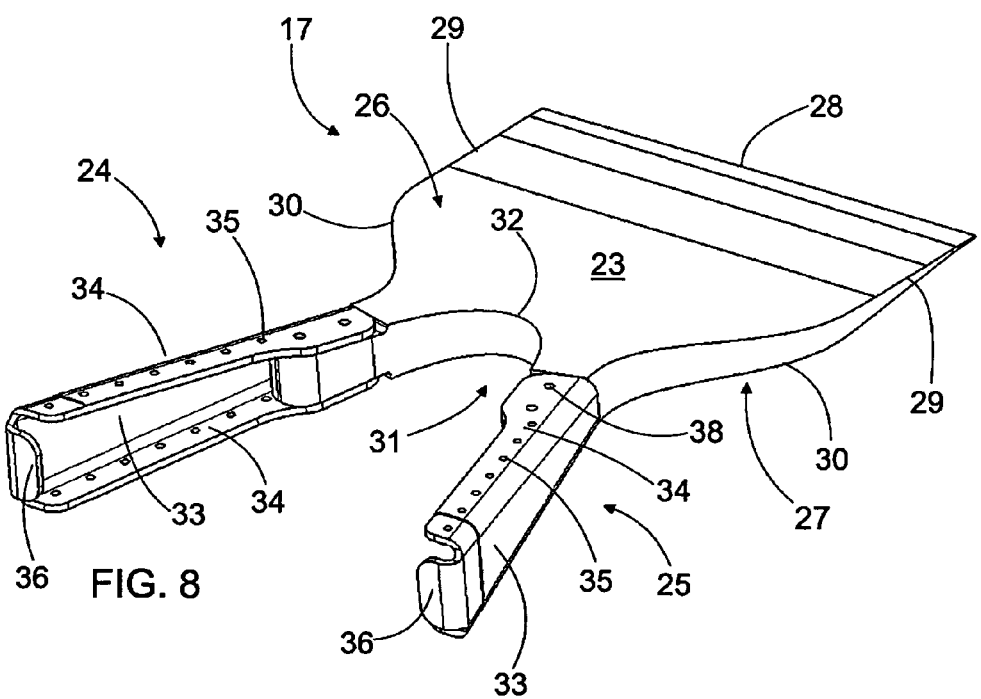
FIG. 8 is a schematic view of a support piece of the invention.

FIG. 8 shows a support piece 17 of the invention. The support piece 17 may be made of carbon fiber, for example, and a suitable polymer matrix. The support piece 17 may be a uniform piece comprising the extension portion 23 and the branches 24, 25, or, alternatively, the structure may be like the one shown in FIG. 9, i.e. the extension portion 23 and the branches 24, 25 may be separate pieces that can be assembled together. As already mentioned above, the cross-section of the extension portion 23 may be wedge-shaped so that it corresponds to a wedge-shaped space at the trailing edge of the panel 3, between the first surface plate 10 and the second surface plate 11. The thickness of the extension portion 23 may be at its greatest at the front edge thereof, and the extension portion 23 may comprise a substantially flat first surface 26 and second surface 27. The first surface 26 may be arranged against the inner surface of the first surface plate 10 and the second surface 27 against the inner surface of the second surface plate 11 of the panel 3. The extension portion 23 may be shaped as desired. It may comprise a substantially straight rear edge 28 whereto inclined longitudinal portions 29 may join, and the latter may, in turn, join to curved portions 30 towards the front edge 31 of the extension portion 23. The longitudinal portions 29 and the curved portions 30 may be arranged such that the extension portion 23 narrows towards its front edge 31. The shape of the extension portion 23 may resemble that of a swim fin. The front edge 31 may have the first branch 24 and the second branch 25 joined thereto, the branches being spaced apart. Between the branches 24, 25 the front edge 31 may be provided with a rearward curved portion 32.

The free ends of the first branch 24 and the second branch 25 may be at a greater distance from one another than the ends that come against the extension portion 23. Thus a structure substantially of the shape of an inverted V is formed. The shape of the cross-section of the branches 24, 25 may substantially resemble a U turned 90 degrees, i.e. the branches have a vertical flange 33 and two lateral flanges 34. The lateral flanges 34 may be provided with openings 35 through which the lateral flanges 34 may be attached to the surface plates 10, 11 of the panel 3 by means of rivets, for example. The free edges of the lateral flanges 34 of the branches 24, 25 may be directed to face each other to facilitate the fastening to be made through the opening 18. Further the free ends of the branches 24, 25 may be provided with end flanges 36 to which the hinges 16b, 16c can be attached.

Figure 9:
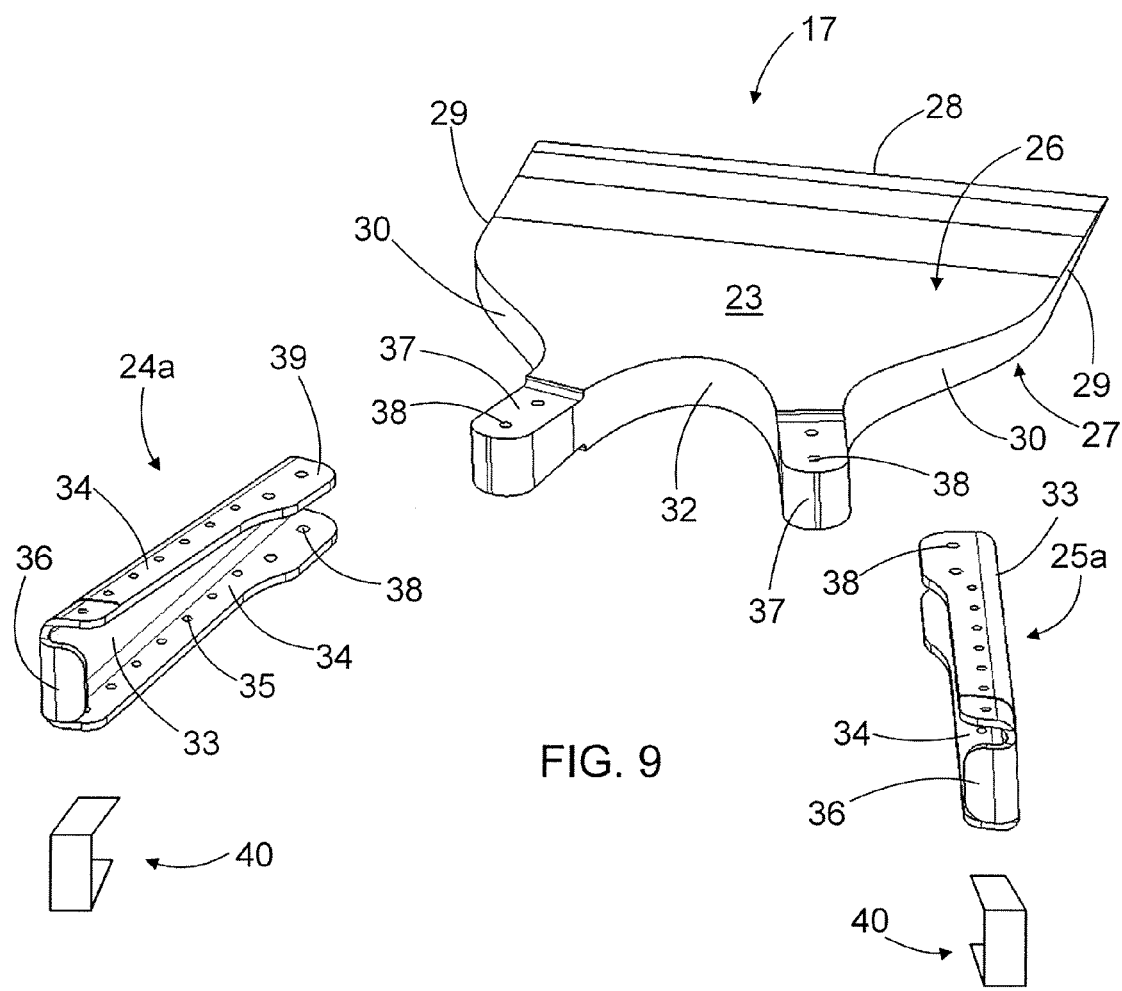
FIG. 9 is a schematic view of a support piece of the invention, with components of the support detached from each other.

FIG. 9 shows a support piece 17 prior to assembly. The extension portion 23 and the branches 24, 25 may be separate pieces that may be assembled before they are mounted to the frame structure of the panel 3. The front edge 31 of the extension portion 23 may be provided with fastening protrusions 37 to which the branch pieces 24a, 25a may be fastened. The fastening protrusion 37 may be-dimensioned and shaped so that it fits into the space between the lateral flanges 34 of the branch piece 24a, 25a and can rest firmly against the lateral flanges 34 and the vertical flange 33. Further, the fastening protrusion 37 and the branch piece 24a, 25a may be provided with openings 38 for assembly. The lateral flanges 34 of the branch pieces 24a, 25a may be provided with a widening 39 coinciding with the fastening protrusion 37 to make the flanges rest better against the protrusions 37. FIG. 9 further shows separate sealing pieces 40 that may be placed between the front ends of the branches 24, 25 and the front spar 12 to seal the structure. The sealing piece 40 may block the gap between the end flange 36 and the lateral flanges 34. The sealing piece 40 may comprise walls parallel with the vertical flange 33, lateral flange 34 and end flange 36. Alternatively, it is possible to shape the front ends of the branches 24, 25 so that no gaps are left between the end flange 36 and the lateral flange 34.

Figure 10:
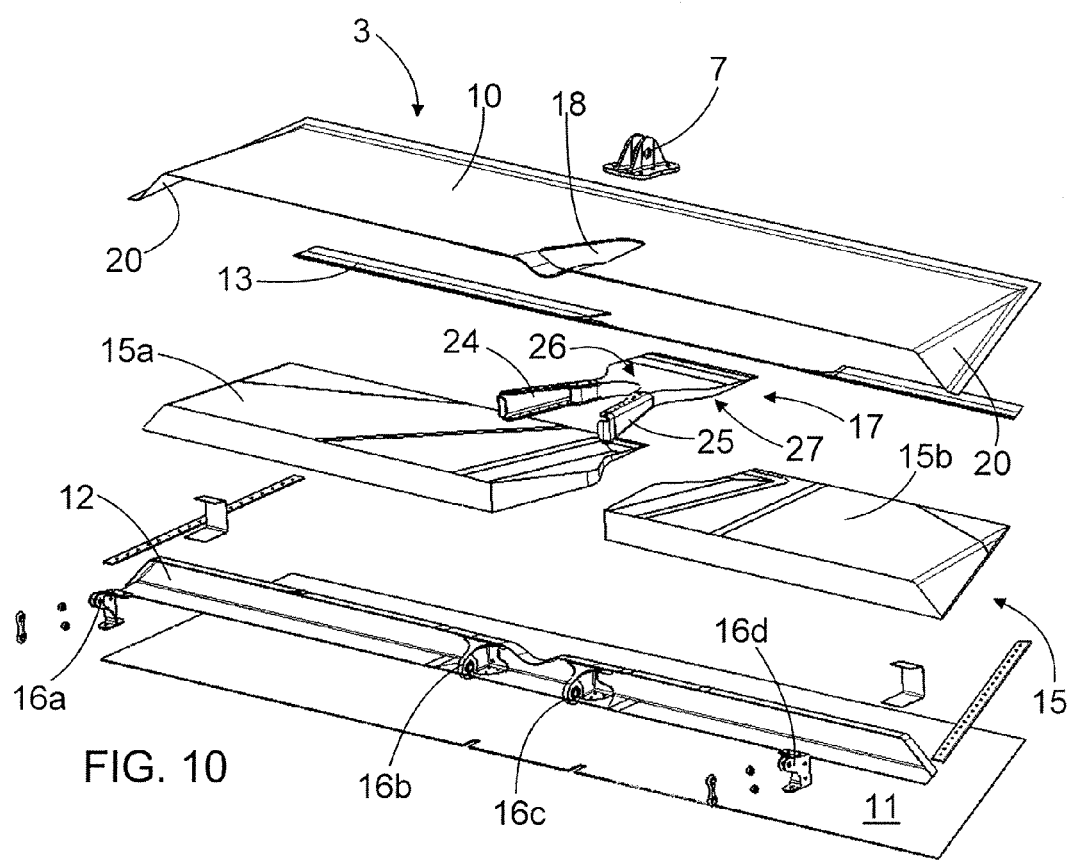
FIG. 10 is a schematic view of an alternative construction for the pivoting panel, with components of the panel detached from each other.

FIG. 10 shows what is known as an explosion view of an alternative construction of the pivoting panel 3. The basic construction may be otherwise substantially similar to the one shown in the explosion view of FIG. 6, except that here the longitudinal supports 14 are replaced by one or more cellular structures 15 to stiffen the panel 3. The solution of FIG. 10 includes two cellular structures 15a, 15b, and between them a space is left for the support piece 17 of the invention. Inner end surfaces of the cellular pieces 15a, 15b may be shaped to substantially conform to the outer shapes of the support piece 17. The cellular structure 15 may be a honeycomb, for example, or any other cellular structure known per se. During assembly the components of the panel 3 may be attached to each other by using required adhesive agents, sealing agents and fastening members.

In some cases the extension portion 23 of the support piece 17 may be provided with one or more through holes to make the structure lighter.

In this application a pivoting panel refers, among others, to spoilers, landing flaps, ailerons, air brakes, elevators and rudders and, further, to any other surfaces that are pivotable relative to their hinges and may be used in aircraft control and flight management. Further, the term aircraft is used in this application to refer to different kinds of airplanes, airships, satellites, space shuttles and other equipment flown in the air.

The drawings and the related specification are only meant to illustrate the inventive idea. The details of the invention may vary within the scope of the claims.

What is claimed is:

1. A pivoting panel for an aircraft, comprising:
a first surface plate and a second surface plate;
a front spar at a front edge of the panel and a rear spar at a rear edge of the panel;
a frame structure arranged into a space defined by the surface plates and the spars;
at least two hinges arranged on a front edge portion of the panel;
and at least one actuator connection fitting to which an actuator is connectable for pivoting the panel in relation to the hinges,
wherein the frame structure comprises at least one support piece made of a composite material;
the support piece comprises at least an extension portion; the position of the extension portion is arranged to correspond to that of the actuator connection fitting;
and the extension portion is provided with a first surface and a second surface, the first surface being attached to an inner surface of the first surface plate of the panel and the second surface of the extension portion being attached to an inner surface of the second surface plate, whereby during assembly the support piece is arranged as an integral part of the panel;
and wherein the support piece further comprises a first branch and a second branch arranged inside the space defined by the surface plates and the spars, and at a distance from each other, the distance between outermost ends of the branches being greater than that between innermost ends of the first and second branches thereby forming a structure having an inverted V-shape.

2. A panel according to claim 1, wherein
the actuator connection fitting has a fastening flange;
and surface areas of the first surface and the second surface of the extension portion are greater than a surface area of the fastening flange of the actuator connection fitting.

3. A panel according to claim 1, wherein
the actuator connection fitting has a fastening flange;
and the surface areas of the first surface and the second surface of the extension portion are at least twice as large as a surface area of the fastening flange of the actuator connection fitting.

4. A panel according to claim 1, wherein the extension portion has a wedge-shaped cross-section;
and the extension portion is arranged into a wedge-shaped space in the trailing edge of the panel.

5. A panel according to claim 1, wherein
the support piece comprises a first branch and a second branch extending from the extension portion to the front edge portion of the panel at a first distance; the first and second branches are arranged at a second distance from one another and having first and second ends;
the branches are coupled from their first ends to a first edge of the extension portion;
the second ends of the branches extend to the front edge portion of the panel; and the second ends of the first branch and the second branch are provided with hinges attached thereto, the support piece thus being arranged to form a uniform fastening part for fastening both the actuator connection fitting and the hinges.

6. A panel according to claim 5, wherein the first or second surface plate has an opening.

7. A panel according to claim 6, wherein the opening is between the first and second branches of the support piece.

8. A panel according to claim 5, wherein the first and second branches of the support piece are fastened to the first and second surface plates.

9. A panel according to claim 1, wherein
the frame structure of the panel comprises a plurality of longitudinal supports between the surface plates;
the longitudinal supports comprise two lateral flanges with a vertical flange between them;
the lateral flanges are attached to the surface plates;
and the front end of the longitudinal support is attached to the front spar and the rear end thereof to the rear spar.

10. A panel according to claim 1, wherein
the frame structure of the panel comprises at least one cellular structure between the surface plates.

11. A panel according to claim 1, wherein
the panel is entirely made of a composite material;
and the composite material comprises at least one reinforcing fiber and at least one polymer matrix.

12. A pivoting panel for an aircraft, comprising:
a first surface plate and a second surface plate;
a front spar at a front edge of the panel and a rear spar at a rear edge of the panel;
a frame structure arranged into a space defined by the surface plates and the spars;
at least two hinges arranged on a front edge portion of the panel;

and at least one actuator connection fitting to which an actuator is connectable for pivoting the panel in relation to the hinges, and wherein the frame structure comprises at least one support piece made of a composite material;

the support piece comprises at least an extension portion; the position of the extension portion is arranged to correspond to that of the actuator connection fitting;

the extension portion is provided with a first surface and a second surface, the first surface being attached to an inner surface of the first surface plate of the panel and the second surface of the extension portion being attached to an inner surface of the second surface plate, whereby during assembly the support piece is arranged as an integral part of the panel; and the cross-section of the extension portion is wedge-shaped; and the extension portion is arranged into a wedge-shaped space proximate a trailing edge of the panel opposite the front edge.

13. A pivoting panel for an aircraft, comprising:

a first surface plate and a second surface plate;

a front spar at the front edge of the panel and a rear spar at the rear edge of the panel;

a frame structure arranged into a space defined by the surface plates and the spars;

at least two hinges arranged on the front edge portion of the panel;

and at least one actuator connection fitting to which an actuator is connectable for pivoting the panel in relation to the hinges, wherein the frame structure comprises at least one support piece made of a composite material;

the support piece comprises at least an extension portion; the position of the extension portion is arranged to correspond to that of the actuator connection fitting;

the extension portion is provided with a first surface and a second surface, the first surface being attached to an inner surface of the first surface plate of the panel and the second surface of the extension portion being attached to an inner surface of the second surface plate, whereby during assembly the support piece is arranged as an integral part of the panel;

the support piece further comprises an elongated first branch and an elongated second branch arranged inside the space defined by the surface plates and the spars, and extending from the extension portion to the front edge portion of the panel at a first distance; the first and second branches are arranged at a second distance from one another thereby forming an open space therebetween and having first and second ends;

the branches are coupled from their first ends to the first edge of the extension portion;

the second ends of the branches extend to the front edge portion of the panel; and the second ends of the first branch and the second branch are provided with hinges attached thereto, the support piece thus being arranged to form a uniform fastening part for fastening both the actuator connection fitting and the hinges.

14. A pivoting panel for an aircraft, comprising:

a first surface plate and a second surface plate;

a front spar at a front edge of the panel and a rear spar at a rear edge of the panel;

a frame structure arranged into a space defined by the surface plates and the spars;

at least two hinges arranged on a front edge portion of the panel;

and at least one actuator connection fitting to which an actuator is connectable for pivoting the panel in relation to the hinges, and wherein the frame structure comprises at least one support piece made of a composite material;

the support piece comprises at least an extension portion and branches arranged inside the space defined by the surface plates and the spars; the position of the extension portion is arranged to correspond to that of the actuator connection fitting and at a distance from the front spar towards the rear edge of the panel;

and the extension portion is provided with a first surface and a second surface, the first surface being attached to an inner surface of the first surface plate of the panel and the second surface of the extension portion being attached to an inner surface of the second surface plate, whereby during assembly the support piece is arranged as an integral part of the panel.

15. A pivoting panel for an aircraft, comprising:

a first surface plate and a second surface plate;

a front spar at a front edge of the panel and a rear spar at a rear edge of the panel;

a frame structure arranged into a space defined by the surface plates and the spars;

at least two hinges arranged on a front edge portion of the panel;

and at least one actuator connection fitting to which an actuator is connectable for pivoting the panel in relation to the hinges, and wherein the frame structure comprises at least one support piece made of a composite material;

the support piece comprises at least an extension portion; the position of the extension portion is arranged to correspond to that of the actuator connection fitting at a shorter distance from the rear spar compared to a distance from the front spar;

and the extension portion is provided with a first surface and a second surface, the first surface being attached to an inner surface of the first surface plate of the panel and the second surface of the extension portion being attached to an inner surface of the second surface plate, whereby during assembly the support piece is arranged as an integral part of the panel.

16. A pivoting panel for an aircraft, comprising:

a first surface plate and a second surface plate;

a front spar at a front edge of the panel and a rear spar at a rear edge of the panel;

a frame structure arranged into a space defined by the surface plates and the spars;

at least two hinges arranged on a front edge portion of the panel;

and at least one actuator connection fitting to which an actuator is connectable for pivoting the panel in relation to the hinges, and wherein the frame structure comprises at least one support piece made of a composite material;

the support piece comprises at least an extension portion; the position of the extension portion is arranged to correspond to that of the actuator connection fitting;

and the extension portion is provided with a first surface and a second surface, the first surface being attached to an inner surface of the first surface plate of the panel and the second surface of the extension portion being attached to an inner surface of the second surface plate, whereby during assembly the support piece is arranged as an integral part of the panel;

wherein the support piece further comprises a first branch and a second branch arranged at a distance from each other, the distance between outermost ends of the branches being greater than that between innermost ends of the first and second branches thereby forming a structure having an inverted V-shape, and wherein the support piece and the front spar form a substantially triangular support piece between the actuator connection fitting and the hinges.

17. A pivoting panel for an aircraft, comprising:
a first surface plate and a second surface plate;
a front spar at a front edge of the panel and a rear spar at a rear edge of the panel;
at least two hinges arranged on a front edge portion of the panel; and
an actuator connection fitting to which an actuator is connectable for pivoting the panel in relation to the hinges, the actuator connection fitting being secured on an outer surface of the first surface plate at a distance from the front edge of the panel;
wherein the surface plates and the spars house therewithin a frame structure comprising an extension portion and first and second branches arranged below the actuator connection fitting to support the actuator connection fitting thereon.

18. A pivoting panel according to claim 17, wherein the surface plates and the spars form a sealed box-type structure.

* * * * *